May 27, 1924.
J. S. MATTESON
TRACK LINK FOR TRACTORS
Filed Jan. 3, 1922
1,495,708
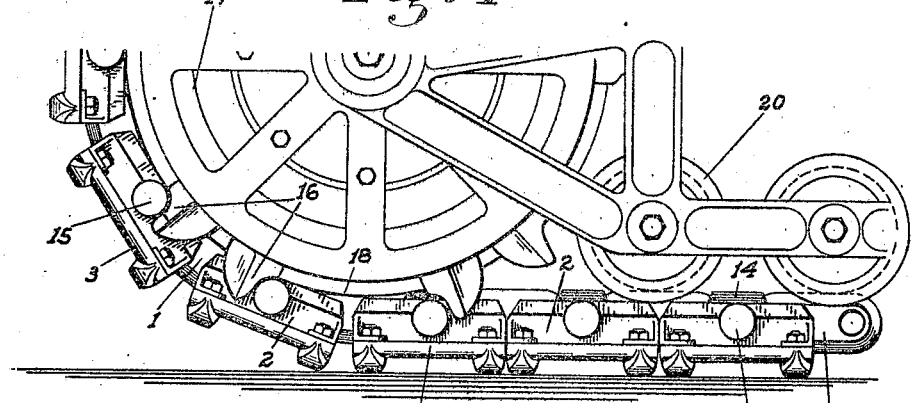
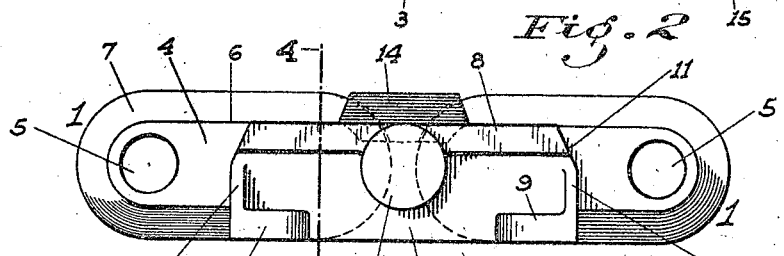
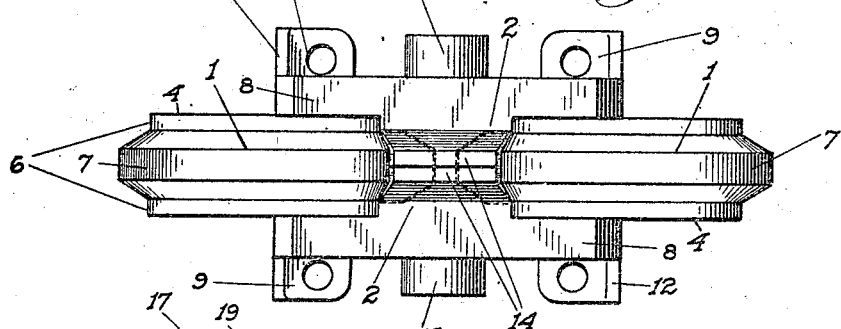
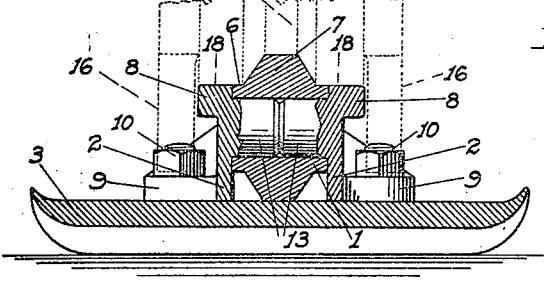
INVENTOR.
J. S. Matteson
BY
ATTORNEY Patented May 27, 1924.

1,495,708

UNITED STATES PATENT OFFICE.

JEROME S. MATTESON, OF STOCKTON, CALIFORNIA.

TRACK LINK FOR TRACTORS.

Application filed January 3, 1922. Serial No. 526,592.

*To all whom it may concern:*

Be it known that I, JEROME S. MATTESON, a citizen of the United States, residing at Stockton, county of San Joaquin, State of California, have invented certain new and useful Improvements in Track Links for Tractors; and I do declare the following to be a full, clear, and exact description of the same, reference being had to the accompanying drawings, and to the characters of reference marked thereon, which form a part of this application.

This invention relates to improvements in flexible track construction such as is used on tractors supported on an endless ground bearing structure instead of directly by the wheels.

In this type of structure, the essential features are an endless chain or link member, engaged by some form of sprocket wheel, and the relatively broad ground bearing shoes carried by individual links.

In a good many claims for this purpose, the links are hollow, and the teeth of the driving sprocket wheel enter the links between the sides thereof. Since the links are frequently submerged in mud during operation, the hollow spaces become filled, and when the teeth engage the links with their driving pressure, some of this mud is bound to be pressed against the link rollers in a hard mass, resulting in rapid abrasion of the co-operating parts and frequent breakage due to the unyielding effect of the caked mud, clay and the like.

The principal object of my invention is to provide a track link structure in which the above named defects are avoided by eliminating the open feature of the links and providing members on the outside of the links to be engaged for driving purposes by the teeth or lugs on a special form of sprocket or driving wheel to be used therewith.

A further object is to provide a chain link structure which, in connection with the driving sprocket and idler supporting rollers, will be positively held from side-swaying or any lateral movement, so that there is no tendency for the driving teeth to grind against the sides of the links and have to thus force them into proper alinement.

Another object is to provide a chain link and ground bearing shoe combination consisting of the least possible number of separate parts, and adapted to be so connected together that no axial pins or bolts of any character are used to hold the male and female link members together.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a side view of a portion of my improved track structure, shown in connection with the driving wheel and idler rollers.

Fig. 2 is an enlarged detached side view of a connected number of links.

Fig. 3 is a top plan view of the same.

Fig. 4 is a cross section taken on a line 4—4 of Fig. 2.

Referring now more particularly to the characters of reference on the drawings, my track link and shoe structure comprises essentially the inner link members 1, outer links 2, and the ground bearing shoes 3 extending transversely of the latter and connected thereto.

The inner links may be considered as solid bars, each consisting of a flat-sided portion 4, rounded at the ends and provided with bored holes 5 positioned axially of the curved ends.

From a line set in somewhat from the outer face of the portion 4, so as to leave a ledge 6 on each side thereof, the sides of the link slope outwardly and toward each to the outer edge of the link to form a tapered ridge 7 all around, the outer edge face of this ridge being parallel with that of the portion 4 throughout.

Each outer link structure 2 consists of a pair of symmetrical and equal sized plate members, extending on both sides of a pair of adjacent inner links to a point midway of the length of such links, the latter being spaced apart somewhat.

Each outer link member is a solid and substantially rectangular plate, having a flange 8 projecting outwardly therefrom along the inner edge thereof, by "inner" meaning that edge which lies nearest the wheels and rollers over which the track structure travels. The edge face of this flange is in alinement with the corresponding ledge surfaces 6 of the inner links when the latter lie in straight alinement with the outer links, while the opposite edge is in alinement with the outer edge of the taper portions 7.

Projecting outwardly of the link-plates 2 adjacent the outer ends thereof are pads 9, adapted to rest on the transversely disposed shoes 3 and to be fixed thereto by rivets or bolts 10.

The ends of the members 2 are at right angles to the outer longitudinal edges thereof for the greater portion of their height, and are then cut away adjacent the inner edges of said members as shown at 11, while the pads 9 have reinforcing ribs 12 in transverse alinement with said right-angled end portions. The outer links are adapted to abut one against the other when in straight alinement, so that by means of the above described design of the parts the links cannot buckle inwardly, the ribs helping to withstand any such tendency, while at the same time the cut-away portions allow the necessary bending of the link structure when passing about the driving wheel.

Each plate 2 has a pair of inwardly projecting bosses 13 adapted to project half way through the bores 5 of the inner links, the corresponding bosses on both plates 2 abutting against each other when in position so that there will be no binding between the adjacent flat surfaces of the outer and inner links.

Formed with each plate 2 and projecting from the flanged edge 8 between the adjacent ends of a pair of inner links is a ridge member 14, terminating on a line with the edge of the portion 7 of the inner links; both such members on a corresponding pair of the outer link plates being recessed to receive the ends of the ridges 7 and abutting closely against each other when in position, the cross sectional area of said members 14 combined being the same as that of the portions 7 of the links 1.

Positioned centrally of the length of the plates 2 and projecting from the outer faces thereof in transverse alinement and beyond the flanges 8 are preferably integral and round bosses 15, which are adapted to be engaged by the teeth or lugs 16 formed in spaced relation on the sides of a driving wheel 17. This wheel has flat faces 18 inwardly of the lugs, on which ride the inner edge-faces of the flanges 8 and the ledges 6, while between the wheel faces is a groove 19 of a size and shape to conform to and receive the tapered portions 7 and 14.

Idler rollers 20, similarly grooved and faced, support the track structure beyond the driving wheel and aid in holding the track against a tendency to buckling and lateral movement.

It will be noted from Fig. 1, that the lugs 16 are unevenly spaced on the wheel, and are arranged in opposed pairs.

When turning in one direction therefore, alternate ones of the lugs engage alternate ones of the bosses 15, while the intermediate lugs and bosses are relatively idle. When the direction of rotation of the driving wheel is reversed, the reverse conditions of driving the track structure obtain, and thus there is no chance for any slipping movement between the wheel and link structure when the wheel is reversed in its direction of rotation.

It will also be noted, that the inner links being symmetrically formed on both sides, may be reversed in position with respect to the outer links at any time, thus enabling even wearing being had, and the track should have a long period of usefulness without replacement of any parts.

It will further be noted that the bolts which hold the shoes to the outer links are ample to hold the outer links together, since the sprocket teeth or lugs not entering between the links, there is no tendency for the latter to become spread apart.

Also, while I have specified the ridges 7 and 14, and the corresponding wheel-grooves as being wedge-shaped, they may be rectangular, triangular or semicircular in cross section.

The outer link members, while not reversible, are interchangeable, that is, they are made from a common pattern and are not right and left hand as usual, so that they may be interchanged and placed on either side of the inner link, in the event that wear on one side is greater than on the other, and it is desired to equalize this wear without placing a new link-plate.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A track link structure for tractors including outer and inner link members flexibly connected together, and having flat faces along the inner edges thereof, ridge portions disposed intermediate the flat faces and projecting inwardly thereof, and bosses projecting outwardly of the sides of the outer links.

2. A track link structure comprising inner links bored adjacent each end, outer links overlapping the adjacent ends of a pair of inner links, and bosses formed with the outer link members and projecting into the bores of the inner links, the ends of said bosses abutting against each other, whereby to allow of clearance being positively maintained between the adjacent faces of the links.

3. A track link structure comprising reversible inner links bored adjacent both ends, said links being rounded at the ends, outer links overlapping the adjacent ends of a pair of inner links, bosses formed with the outer link members and projecting into the bores of the inner links, ridges on the inner links projecting beyond the edges of the outer links, and symmetrical members on each pair of outer links together forming a ridge equal in cross sectional area to those on the inner links and interposed between adjacent inner links.

4. A track-link structure comprising inner and outer links flexibly connected together, each transverse pair of outer links overlapping the adjacent ends of a pair of inner links, ridges on the inner links projecting beyond the edges of the outer links and a ridge structure equal in cross section to those on the inner links fixed on each transverse pair of outer links and interposed between adjacent inner links.

In testimony whereof I affix my signature.

JEROME S. MATTESON.